United States Patent
Badino et al.

(10) Patent No.: US 9,328,784 B2
(45) Date of Patent: May 3, 2016

(54) SUPPORTING AND BRAKING ASSEMBLY FOR A MOTOR VEHICLE WHEEL

(71) Applicant: Fiat Group Automobiles S.p.A., Turin (IT)

(72) Inventors: Renato Badino, Turin (IT); Stefano Luca', Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

(21) Appl. No.: 14/308,803

(22) Filed: Jun. 19, 2014

(65) Prior Publication Data

US 2014/0375010 A1 Dec. 25, 2014

(30) Foreign Application Priority Data

Jun. 21, 2013 (IT) .............................. TO2013A0514

(51) Int. Cl.
| | | |
|---|---|---|
| *F16D 65/00* | (2006.01) | |
| *F16D 55/226* | (2006.01) | |
| *B62D 7/18* | (2006.01) | |
| *F16D 55/2265* | (2006.01) | |
| *F16D 55/227* | (2006.01) | |
| *F16D 55/00* | (2006.01) | |

(52) U.S. Cl.
CPC .............. *F16D 65/0062* (2013.01); *B62D 7/18* (2013.01); *F16D 55/226* (2013.01); *F16D 55/227* (2013.01); *F16D 55/22655* (2013.01); *F16D 2055/0008* (2013.01)

(58) Field of Classification Search
CPC .......... B62D 7/18; B62B 5/04; B62B 5/0433; B62B 2005/0471; F16D 65/092; F16D 65/095; F16D 2055/0008; F16D 2055/0012
USPC .......... 280/88, 264, 427, 428; 188/73.1, 73.2, 188/73.31

See application file for complete search history.

(56) References Cited

U.S. PATENT DOCUMENTS 3,805,925 A * 4/1974 Schoenhenz ................ 188/73.45
4,151,899 A * 5/1979 Wright ........................ 188/73.38
(Continued)

FOREIGN PATENT DOCUMENTS

| DE | 32 22 733 A1 | 12/1983 |
|---|---|---|
| DE | 10 2004 017 383 A1 | 10/2005 |

(Continued)

OTHER PUBLICATIONS

Burgdorf et al., Spot-type disc brake, Dec. 22, 1983, German Patent Office, DE 32 22 733 A1, Machine Translation of Description.*

*Primary Examiner* — James English
(74) *Attorney, Agent, or Firm* — Blank Rome LLP

(57) ABSTRACT

A supporting and braking assembly for a motor vehicle wheel has a supporting member, defined by a single piece adapted to be coupled to a suspension of the motor vehicle and provided with a central portion coupled to a rotating hub by means of a bearing. The supporting member is also provided with two arms which extend in cantilevered manner from the central portion in essentially radial directions and support respective studs, to which a floating caliper is slidingly coupled. The caliper is arranged straddling a brake disc, fixed and coaxial with respect to the hub, and supports two brake pads arranged on opposite sides of the brake disc. At least one of the studs is sized so as to transfer the tangential loads caused by braking from the caliper directly onto the corresponding arm.

5 Claims, 2 Drawing Sheets

(56) References Cited

U.S. PATENT DOCUMENTS

| | | | | |
|---|---|---|---|---|
| 4,391,355 A | * | 7/1983 | Evans | 188/73.44 |
| 4,537,290 A | * | 8/1985 | Evans | 188/73.31 |
| 4,537,292 A | * | 8/1985 | Tamura | 188/73.39 |
| 4,858,998 A | * | 8/1989 | Welschof et al. | 301/126 |
| 4,976,339 A | * | 12/1990 | Le Marchand | 188/73.45 |
| 5,188,202 A | * | 2/1993 | Terashima | 188/73.45 |
| 5,911,425 A | | 6/1999 | Hofmann et al. | |
| 6,305,509 B1 | * | 10/2001 | Concialdi | 188/73.31 |
| 7,331,430 B2 | * | 2/2008 | Valvano et al. | 188/71.5 |
| 2006/0049006 A1 | * | 3/2006 | Hasegawa et al. | 188/73.1 |
| 2007/0151814 A1 | * | 7/2007 | Delayre et al. | 188/71.5 |
| 2010/0193300 A1 | * | 8/2010 | Saito et al. | 188/72.4 |

FOREIGN PATENT DOCUMENTS

| | | |
|---|---|---|
| FR | 2 631 405 A1 | 11/1989 |
| GB | 2 130 319 A | 5/1984 |
| GB | 2 199 906 A | 7/1988 |

\* cited by examiner

SUPPORTING AND BRAKING ASSEMBLY FOR A MOTOR VEHICLE WHEEL

BACKGROUND OF THE INVENTION

1. Field of the Invention

The present invention relates to a supporting and braking assembly for a motor vehicle wheel.

2. Description of the Related Art

Floating caliper disc brakes are normally provided for the front wheels on motor vehicles. As is known, a brake of this type comprises a supporting upright; a brake disc, which is supported pivotally by the upright and is fixed and coaxial with respect to the wheel; and a brake caliper, which supports two brake pads arranged on opposite axial sides of the disc and is slidingly coupled to two studs or pins so as to float in direction parallel to the axis of the wheel when one of the two brake pads is subjected to the thrust of a hydraulically-operated actuator cylinder, which is part of the caliper.

In known solutions, the two studs are generally supported by a plate or bracket, which in turn is fixed to the aforesaid upright by means of two screws.

The need is felt to eliminate the bracket and therefore, couple the caliper directly to the upright, so as to reduce the number of components and therefore the assembly times and costs, and in order to reduce the weight and possible clearances between the caliper and the upright with respect to the solutions of the type described above.

To this end, U.S. Pat. No. 5,911,425, discloses a supporting upright aiming to meet the aforesaid need. In particular, this upright comprises a central part and two arms which extend radially outwards from the central part up to an outer edge of the brake disc. The caliper is connected to the upright by means of two pin guides so as to be guided and slide axially when the actuator cylinder is activated. The ends of the two arms indicated above are defined by guide teeth, to which the brake pads are axially slidingly coupled. Therefore, the braking forces are transferred tangentially from the brake pads directly to the guide teeth of the upright, without involving the caliper and the two studs.

The solution shown in this document is not very satisfactory, because there is a need to make the two arms of the upright with increased accuracy to ensure, in use, the desired tolerances in the coupling between the aforesaid guide teeth and the brake pads and therefore the proper operation of the brake pads.

By also implementing the tolerances planned in the project, the coupling with the guide teeth may in any event be subjected to undesired jamming, which may jeopardise the proper operation of the brake pads, or damage the anti-corrosion coating which is normally applied to the aforesaid guide teeth. Such jamming especially occurs if dust or fragments of the friction material of the brake pads get in between the guide teeth and the brake pads. Due to such jamming, for example, the brake pads might not have uniform wear on the surface thereof.

SUMMARY OF THE INVENTION

It is the object of the present invention to make a supporting and braking assembly for a motor vehicle wheel, which allows the above-described drawbacks to be resolved in a simple and affordable manner.

According to the present invention, a supporting and braking assembly is made for a motor vehicle wheel, as described and claimed herein.

BRIEF DESCRIPTION OF THE DRAWINGS

To better comprehend the present invention, a preferred embodiment thereof is now described, by way of a mere non-limiting example, with reference to the accompanying drawings, in which.

DETAILED DESCRIPTION OF THE INVENTION

Figure 1:
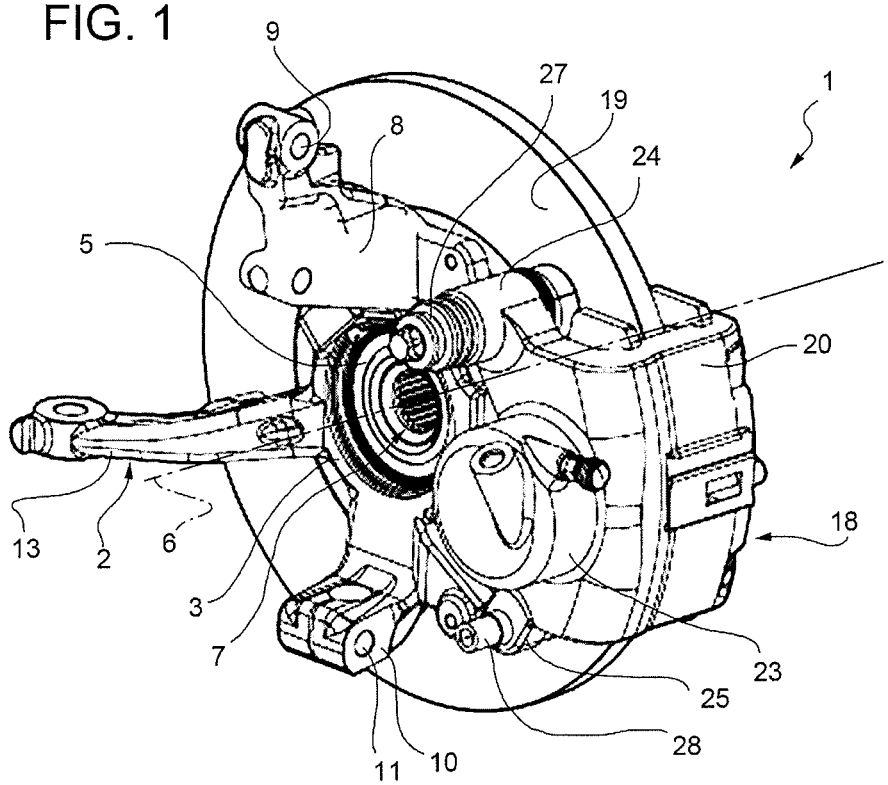
FIG. 1 is a perspective of a preferred embodiment of the supporting and braking assembly for a motor vehicle wheel according to the present invention.
Figure 3:
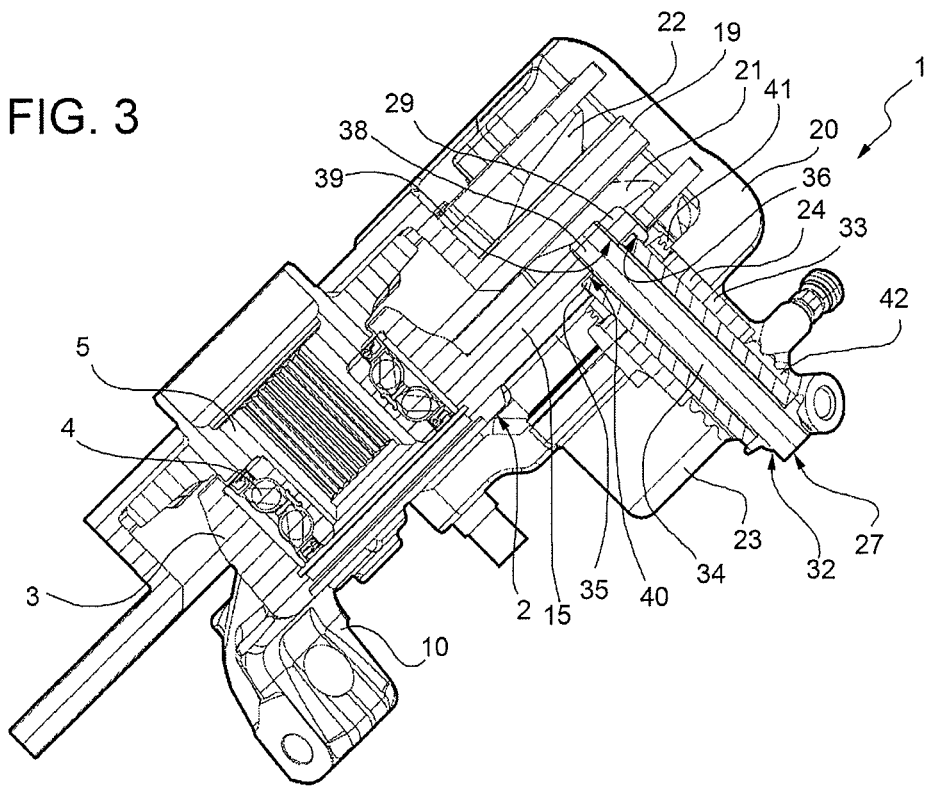
FIGS. 3 and 4 are sections, on enlarged scale, obtained according to the line III-III and the line IV-IV, respectively, in FIG. 2.
Figure 4:
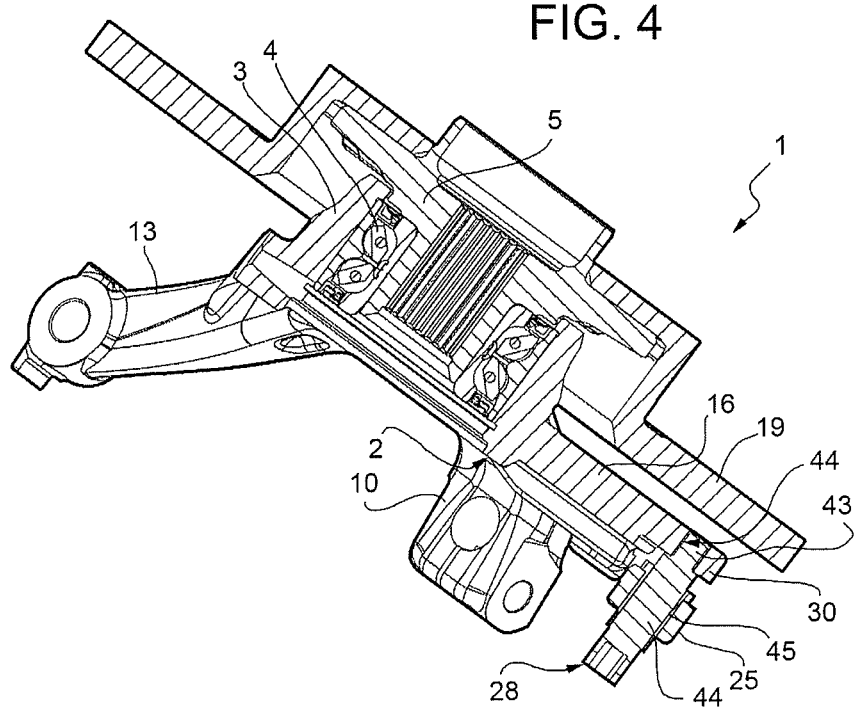

Numeral 1 in FIG. 1 indicates a supporting and braking assembly for a front wheel (not shown) of a motor vehicle. Assembly 1 comprises a load-bearing member 2, generally called "upright", defined by a single piece which is preferably made by means of a single fusion and in turn comprises a central portion 3 connected to a hub 5 by a bearing 4 (FIGS. 3 and 4).

Hub 5 is coaxial to the central portion 3 along an axis 6, supports a wheel (not shown) and has an axial hole 7, which is grooved and is adapted to be engaged by a shaft (not shown), which is part of a transmission assembly of the motor vehicle, to be dragged in rotation with respect to the central portion 3.

The load-bearing member 2 further comprises an upper arm 8, which end is defined by an eyelet 9 connected in known and not shown manner, to a shock absorber of a front suspension of the motor vehicle; a lower arm 10 having an end also defined by an eyelet 11 connected in known and not shown manner, to the front suspension; and a rear lever 13 connected in known manner and not disclosed, to a steering device.

Figure 2:
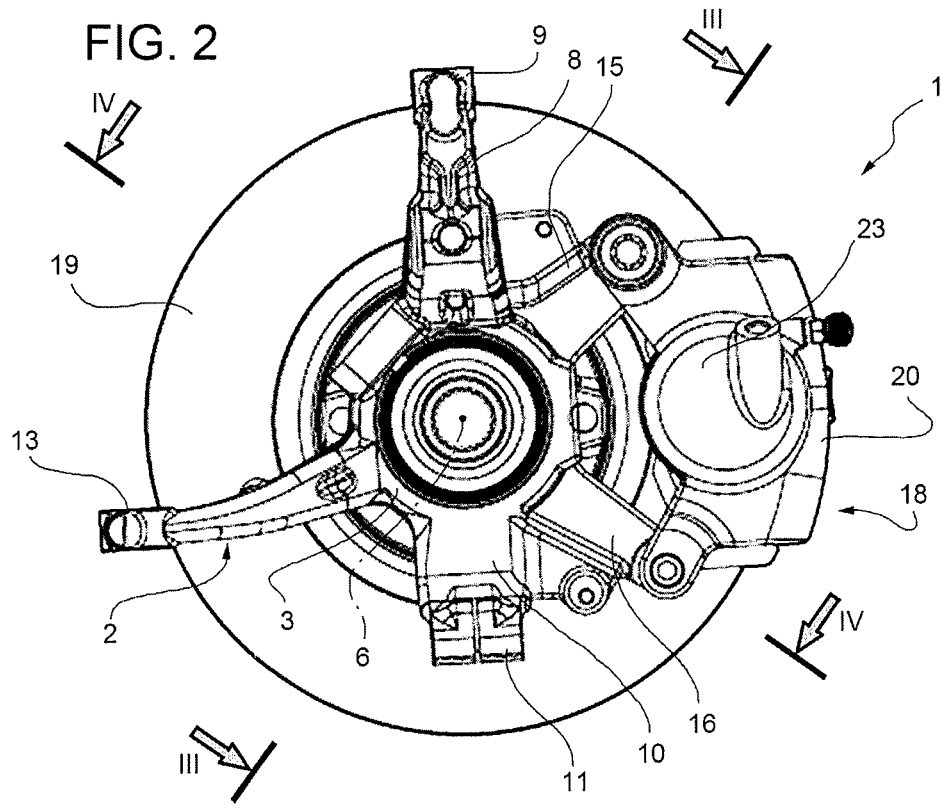
FIG. 2 is a side view of the supporting and braking assembly in FIG. 1.

With reference to FIG. 2, the load-bearing member 2 further comprises two arms 15, 16 which extend in essentially radial directions and in cantilevered manner from a front area of the central portion 3. In particular, arm 15 is arranged above arm 16, in a position which is approximately diametrically opposite to the position of lever 13.

Returning to FIG. 1, assembly 1 further comprises a braking device 18 of the floating caliper type. Device 18 comprises a brake disc 19, which is coaxial and fixed with respect to hub 5, and a caliper 20, which is made preferably of cast iron and/or aluminium, is arranged straddling disc 19 and supports, in a known and not shown manner, two brake pads 21, 22 (partly shown in FIG. 3) arranged on opposite axial parts of disc 19.

The brake pad 21 is axially sliding with respect to caliper 20, under the thrust of a linear hydraulic actuator 23 defined, in known and not shown manner, by one of the two sides of caliper 20. On the other side instead, the corresponding brake pad 22 is fixed axially with respect to caliper 20.

Being of the floating type, caliper 20 has a position which adapts automatically with respect to the faces of disc 19. In other words, the degrees of freedom of caliper 20 allow the brake pads 21, 22 to always be parallel to disc 19 when braking.

Caliper 20 comprises an upper eyelet 24 slidingly coupled with radial clearance to an upper stud 27 parallel to axis 6. At the same time, caliper 20 comprises a lower eyelet 25 slidingly coupled without radial clearance to a lower stud 28, which is also parallel to axis 6. Thereby, caliper 20 may float when actuator 23 is activated to perform the braking. Preferably, the studs 27 and 28 are made of steel.

According to one aspect of the present invention, the brake pads 21, 22 are supported only by caliper 20 and therefore are spaced apart from the arms 15, 16 so as to transfer the tangential braking actions only to caliper 20.

With reference to FIGS. 3 and 4, the studs 27, 28 extend from the ends 29, 30 of the arms 15, 16, respectively, and are therefore supported directly by the ends 29, 30 without interposing any additional bracket between the studs 27, 28 and the load-bearing member 2.

Stud 27 is sized in the project plan so as to support the tangential braking loads which are transferred from caliper 20 to arm 15 during braking. Therefore, the dimensions, in particular the cross section, may be different from one case to the next, according to the maximum braking torque required by assembly 1 and, therefore, according to the application and vehicle model on which assembly 1 is assembled.

As shown in FIG. 3, stud 27 advantageously comprises a screw 32 and a sleeve 33, which is coaxial to screw 32, is fitted on shank 34 of screw 32 with a slight radial clearance and ends axially with a portion 35 which engages, essentially without radial clearance, a seat 36 made in end 29.

Shank 34 ends with a threaded portion 38, which protrudes axially past portion 35 and is screwed into a hole 39, made in end 29. Hole 39 is coaxial to seat 36, has a smaller diameter than the one of seat 36 and exits through a bottom surface 40 of seat 36. The bottom surface 40 defines a shoulder against which portion 35 of sleeve 33 is resting axially. Tightening screw 32 in hole 39 keeps sleeve 33 blocked between the bottom surface 40 and the head of screw 32.

Eyelet 24 is coupled directly on the outer cylindrical surface of sleeve 33 and is interposed axially between two elastic bellows 41, 42, which are also fitted on sleeve 33 to protect it from any dirt.

With reference to FIG. 4, stud 28 is preferably made as a single piece, that is as a single pin which comprises a threaded end portion 43 screwed into a hole 44 of end 30.

Stud 28 also comprises an intermediate portion 44, to which eyelet 25 is coupled. Portion 44 preferably has a larger diameter than portion 43 and is resting axially against a face of end 30. Advantageously, eyelet 25 is coupled to portion 44 by means of a bushing 45 made of elastically deformable and/or damping material, for example of rubber, so as to dampen the sudden movements and noise of caliper 20 and to protect from dirt portion 44 on which eyelet 25 slides.

In use, tangential efforts caused by braking are transferred totally onto stud 27, while bushing 45 serves a damping function. Therefore, the tangential efforts on stud 27 tend to increase the friction and to limit the sliding of eyelet 24 on the outer cylindrical surface of sleeve 33. To obviate such a drawback and properly perform the function of guide, it is preferably provided to lubricate sleeve 33 with specific grease or similar agents.

As indicated above, the tangential loads caused by the braking are transferred from the brake pads 21, 22 onto caliper 20 and from the latter onto stud 27. Stud 27 in turn transfers such loads directly to arm 15 without the interposition of intermediate brackets.

It is therefore apparent on the one hand, that assembly 1 has a relatively low number of components and is relatively lightweight, due to the absence of additional brackets between the supporting member 2 and the studs 27, 28, and on the other, that it allows the realisation to be simplified of arms 15, 16 due to the fact that the brake pads 21, 22 are not guided axially by elements of the supporting member 2, rather are supported only by caliper 20.

Furthermore, the engagement of portion 35 of sleeve 33 in seat 36 allows the tangential loads to be transferred to arm 15 without excessively stressing the threaded coupling between portion 38 and hole 39.

Finally, it is apparent from the above that modifications and variants may be made to assembly 1 herein described and illustrated, without departing from the field of protection of the present invention, as defined in the appended claims.

In particular, sleeve 33 and screw 32 could be made so as to form a single piece.

What is claimed is:

1. A supporting and braking assembly for a motor vehicle wheel, the assembly comprising: a supporting member, defined by a single piece comprising:
   a) a central portion;
   b) an attachment portion which extends from said central portion and is adapted to be coupled to a suspension of the motor vehicle; and
   c) two arms which extend in cantilevered manner from said central portion in essentially radial directions;
   a hub adapted to support said wheel and coupled to said central portion by means of bearing means to turn about a rotation axis; and a floating caliper braking device comprising:
   d) a brake disc, fixed and coaxial with respect to said hub;
   e) a floating caliper arranged straddling said brake disc and having two eyelets slidingly coupled, respectively, to an upper stud and to a lower stud, which are parallel to said rotation axis and are directly fixed, each, to the end of a respective said arm; and
   f) two brake pads arranged on opposite sides of said brake disc and coupled to said floating caliper;
   wherein:
   said brake pads are supported only by said floating caliper; and
   one of said upper and lower stud is sized so as to have a larger outer diameter than the one of the other stud, to transfer the tangential loads caused by braking from said floating caliper directly onto the corresponding arm.

2. An assembly according to claim 1, wherein the stud having the larger outer diameter is defined by said upper stud.

3. An assembly according to claim 2, wherein said upper stud comprises:
   a screw comprising a shank, having a threaded axial end which is screwed into a hole made in the end of the corresponding arm; and
   a sleeve fitted on said shank and comprising an end portion engaging a seat, which is made in the end of the corresponding arm and is coaxial to said hole, said hole exiting through a bottom surface of said seat.

4. An assembly according to claim 2, wherein said floating caliper is coupled to said lower stud by the interposition of a bushing made of elastically deformable and/or damping material.

5. An assembly according to claim 1, wherein the floating caliper is directly slidingly coupled to both the upper stud and the lower stud.

* * * * *